(12) United States Patent
Lammel

(10) Patent No.: US 7,631,003 B2
(45) Date of Patent: Dec. 8, 2009

(54) AUTOMATED TRANSFORMATION FOR STYLE NORMALIZATION OF SCHEMAS

(75) Inventor: Ralf Lammel, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 253 days.

(21) Appl. No.: 11/676,687

(22) Filed: Feb. 20, 2007

(65) Prior Publication Data

US 2008/0201351 A1 Aug. 21, 2008

(51) Int. Cl.
G06F 17/30 (2006.01)
G06F 7/00 (2006.01)
(52) U.S. Cl. ...................... 707/101; 707/102
(58) Field of Classification Search .............. 707/101, 707/102
See application file for complete search history.

(56) References Cited

U.S. PATENT DOCUMENTS

| | | |
|---|---|---|
| 6,898,604 B1 | 5/2005 | Ballinger et al. |
| 7,096,224 B2 | 8/2006 | Murthy et al. |
| 7,134,072 B1 | 11/2006 | Lovett et al. |
| 2003/0163603 A1* | 8/2003 | Fry et al. ............... 709/328 |
| 2004/0064826 A1* | 4/2004 | Lim et al. ............... 719/319 |
| 2004/0201600 A1 | 10/2004 | Kakivaya et al. |
| 2004/0216086 A1 | 10/2004 | Bau |
| 2005/0192990 A1 | 9/2005 | Kharitidi et al. |
| 2006/0129605 A1* | 6/2006 | Doshi .................. 707/104.1 |
| 2006/0190814 A1 | 8/2006 | Collie et al. |
| 2006/0277170 A1 | 12/2006 | Watry et al. |

OTHER PUBLICATIONS

Khan et al.: "Introducing Design Patterns in XML Schemas", by Ayub Khan and Marina Sum, Updated: Nov. 9, 2006.*
Vladimir Gapeyev, et al. XML Goes Native: Run'time Representations for Xtatic. Oct. 26, 2004. http://www.cis.upenn.edu/~bcpierce/papers/xtatic-runtime-TR.pdf.
Ralf Lammel, et al. Mappings made data processing go 'round; an inter-paradigmatic mapping tutorial. http://research.microsoft.com/~emeijer/Papers/Mapping.pdf. Last accessed Dec. 20, 2006.

* cited by examiner

*Primary Examiner*—Kuen S Lu
(74) *Attorney, Agent, or Firm*—Workman Nydegger

(57) ABSTRACT

Systems and methods that facilitate mapping from an XML schema to an object model, while mitigating object impedance mismatch. A normalization component can flatten nesting scopes and/or and reduce the number of types in subtyping hierarchies, and a core mapping component can supply the object type. A subsequent object level transformation can typically be performed on the object model, to create the final object model.

12 Claims, 9 Drawing Sheets

AUTOMATED TRANSFORMATION FOR STYLE NORMALIZATION OF SCHEMAS

BACKGROUND

The XML (eXtended Markup Language) typically provides a standard approach of tagging data, wherein data can be read and interpreted by a variety of Web browsers, and employed in WebServices, for example. Given the enormous proliferation of web hosts and applications on global communications networks such as the Internet, XML documents are used extensively in daily transactions.

Document type definition (DTD) is one technology that defines the document structure of an XML document according to a list of legal elements or building blocks. From a DTD perspective, all XML documents (and HTML documents) are made up of simple building blocks, namely: elements, tags (used to markup elements), attributes (used to provide extra information about elements), entities (variables used to define common text), Parsed Character Data (PCDATA), and Character Data (CDATA). In general, elements are the main building blocks of XML documents. Examples of XML elements include; "note" and "message", and elements can further contain text, other elements, or be empty.

Moreover, the XML Schema is a W3C (World Wide Web Consortium) standard that defines a schema definition language for an XML data model. Schema definitions (e.g., a type definition such as CustomerType that describes structure of information regarding each Customer) can be employed to validate content and structure of XML instance documents. The XML schema document can be expressed differently from table and column definitions of a relational database system. The type information supplied in an XML schema document can also be used to check XML queries for correctness, and optimize XML queries and XML storage.

Also, XML schema provides a more robust replacement to DTD technology. For example, the XML schema is extensible to future additions to allow extending or restricting a type definition; XML schema is richer and more useful than DTD to allow, for example, the capability to define user-defined types; XML schema is written in XML; XML schema supports data types; and XML schema supports namespaces. Unlike DTD, XML schema provides separation between type and element definitions, so that multiple elements (e.g., LocalCustomer and DistantCustomer) of the same type can be defined using a common type definition (e.g., CustomerType). An XML schema document can import other XML schema documents, thereby setting up a type library system.

However, there exists an impedance mismatch between the looseness of the "document world" from which XML evolved, and a more structured world of object oriented programming languages, which dominates the applications world. Bridging such two worlds today is conventionally accomplished by employing specialized objects that model the XML world called "XML Document Object Model," or by "XML Serialization" technologies, which intelligently map one world into the other at runtime. However, such bridging mechanisms are often cumbersome and/or limited in functionality.

Moreover, for certain styles of organizing XML schemas (e.g., Garden of Eden, and the like) if such styles are not paid attention to (e.g., naïve mapping) unexpected object models can result. For example, inappropriate nesting and an unreasonable number of object types.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

The subject innovation facilitates XML to object mapping by normalizing styles associated with XML at a schema level, via a normalization component that mitigates XML object impedance mismatch (e.g., as schemas become more organized, the resulting object model meets expectation). Such normalization component can evaluate nesting scopes and/or analyze subtyping hierarchies, wherein the normalization typically occurs prior to a core mapping. The normalized XML schema (which occurs at the schema level) can then more closely resemble styles for object types/data (e.g., an organized style that resembles an object)—as compared to XML styles prior to normalization—and hence can be leveraged at subsequent stages to readily perform the object mapping. Accordingly, naïve object models are provided that can substantially preserve the XML schemas, while mitigating "XSD-isms".

Moreover, normalization of XML types can be automated in transformations. Hence, the subject innovation enhances object-oriented programming languages by normalizing XML expressions and embedded expressions. Accordingly, programmers can write concise code and can be more productive in both writing and debugging programs, such as with respect to programs that manipulate XML data.

In a related aspect, an analysis component can be associated with the normalization component, to analyze the XML schema and determine which simplifications can be supplied at the schema level stage, and which simplifications are to be performed at a subsequent object level (e.g., after a core canonical mapping is performed), and hence complete the normalization and/or mapping based on the earlier analysis (e.g., create an annotated XML schema.)

According to a further aspect of the subject innovation, a core mapping can be performed after the normalization stage, wherein XML types such as schemas are mapped to object models. Such core mapping can employ a core canonical mapping, to supply the object model. By separating the core mapping from normalization in accordance with the subject innovation, there is an increased likelihood for resulting object model to meet expectation as schemas become more organized, and the schema more closely resembles styles for object types/data to facilitate mapping between XML schemas and object type.

In accordance with a further aspect of the subject innovation, a subsequent transformation at the object level can typically be performed on the object model, to create the final object model. Such transformation at the object level manages normalization for the XML schema that in general cannot be performed via the normalization component (e.g., those XML schema expressivity issues that typically cannot be performed at a schema level), and which require completion at the object level.

The following description and the annexed drawings set forth in detail certain illustrative aspects of the claimed subject matter. These aspects are indicative, however, of but a few of the various ways in which the principles of such matter may be employed and the claimed subject matter is intended to include all such aspects and their equivalents. Other advantages and novel features will become apparent from the following detailed description when considered in conjunction with the drawings.

DETAILED DESCRIPTION

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
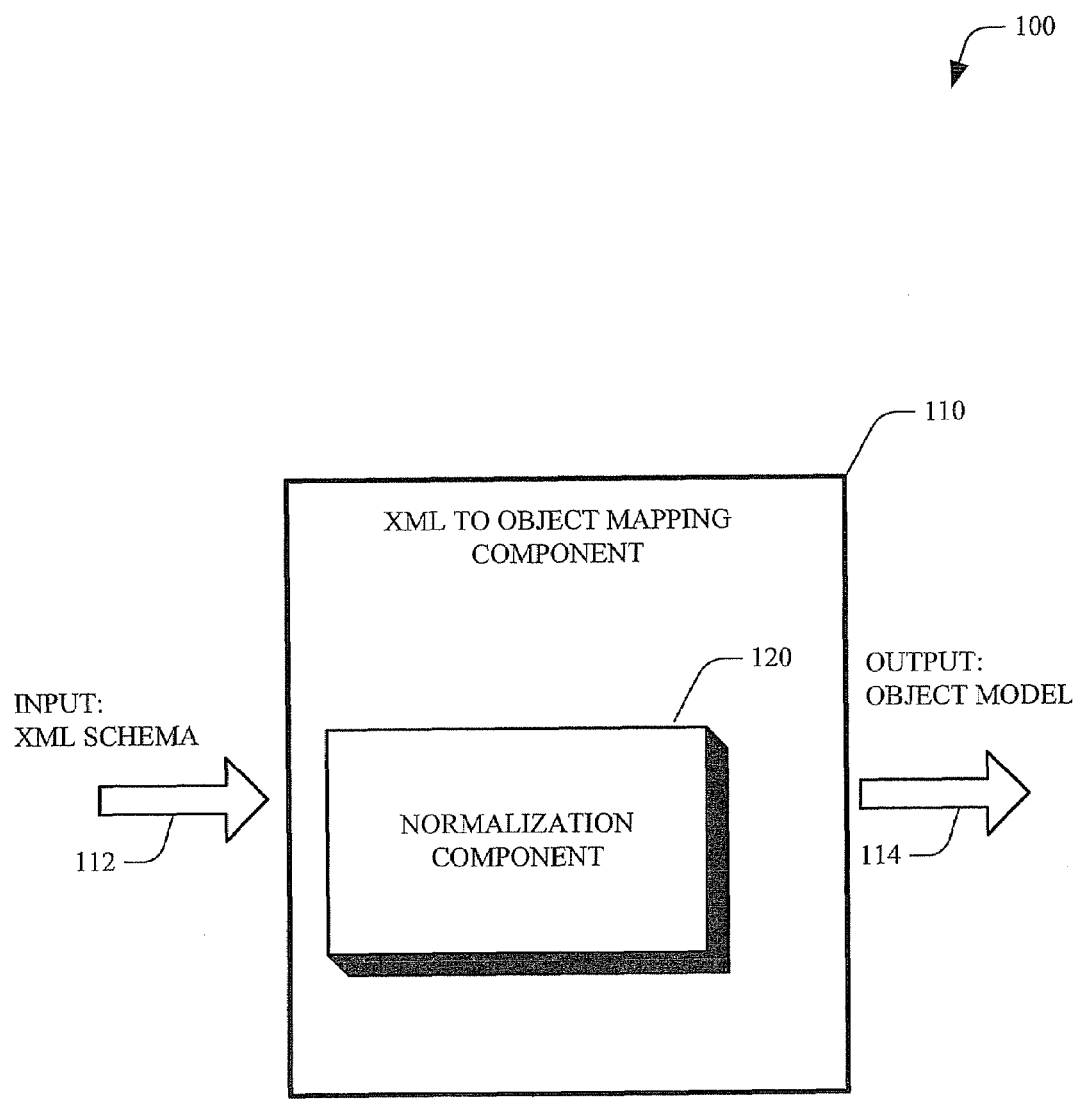
FIG. 1 illustrates a block diagram of an exemplary system with a normalization component that facilitates mapping an XML style to an object model in accordance with an aspect of the subject innovation.

FIG. 1 illustrates a system 100 that facilitates XML to object mapping by normalizing styles associated with XML at a schema level via a normalization component 120, to mitigate XML object impedance mismatch (e.g., resulting object model meets expectation as schemas become more organized). Language elements or constructs including but not limited to expressions of the XML schema 112 can be subjected to a normalization procedure, wherein the normalization performed by the normalization component 120 occurs at a schema level, and before a canonical mapping thereof, as described in detail infra. The normalization component 120 further organizes the XML input schema 112, during such normalization, for example.

In general, the input XML schema 112 describes a structure of an XML document, wherein schema definitions (e.g., a type definition such as DataType that describes the structure of information regarding data) can be employed to validate the content and the structure of XML instance documents. Such XML schema document supplies an XML document that can be expressed in different ways and styles—e.g., different from table and column definitions of a relational database system. The type information supplied in an XML schema document can also be employed to check XML queries for correctness, and optimize XML queries and XML storage. The input XML expressions 112 (also referred to as XML literals or XML literal expressions) are a different kind of primary expression, which is similar, yet markedly distinct, from a standard object-creation expression as illustrated by output 114. For example, expression construct objects can employ one or more XML literals and a defined class structure declared within or otherwise tied or imported into a program code.

XML styles for the input 112 can be organized in different styles with regard to the kinds of abstractions used (element declarations versus complex type definitions), the amount of nesting of content models, and the referencing mechanisms used (element references, type references or both). For example, in Russian Doll style characteristics represent features, wherein: (i) the 'global namespace' is not polluted by any auxiliary element declarations; (ii) the root elements of XML elements are unambiguously defined (in the pure style); (iii) no reuse is typically enabled for inner element declarations; and (iv) the shape of the nested declarations resembles the shape of XML data.

Likewise, for the Venetian Blind style nested element declarations of anonymous, complex types are typically avoided. Complex-type definitions can be employed to capture the types of elements. Local element declarations can use type references to refer to such complex types (and XSD built-in types). When the style is used purely, there typically is no root element declaration. From a schema-modeling perspective, Venetian Blind can imply features, wherein: (i) all 'blinds' can be reused as they are readily named; (ii) in fact, elements of different names can be still assembled from these types; and (iii) the defined complex types can engage in type derivation (by extension or restriction).

Moreover, for the Salami style global element declarations are in general the exclusive form of abstraction in schemas; wherein no complex types are defined, for example. Such global element declarations ('slices') can facilitate anonymous complex types with element references to other slices. From a schema-modeling perspective, Salami Slice can represent features such as: (i) conceptual simplicity, since in general there exists only one sort of nominal schema type (e.g., proper types of labeled elements) (ii) no form of substitution ('subtyping') is typically feasible within limits of the style; and (iii) typically it cannot be expressed (in XSD) that only selected global element declarations serve as document roots. In general, a canonical XML-to-object mapping is bound to map the global element declarations to object types (e.g., OO classes).

Similarly, for Garden of Eden style typically all element declarations are global and all elements are of named types. In such style, element declarations are global and all elements are of named types. Also, complex-type definitions facilitate element references (as opposed to local elements declaration).

Each 'conceptual type' can be defined by two XSD abstractions (an element declaration and a complex-type definition). Without further effort, a canonical XML-to-object mapping typically should map such two abstractions to two different classes. It is to be appreciated that one can adopt a more or less extreme style with regard to elements of simple type as well as simple attributes. In a more extreme style, even these attributes and elements give rise to global declarations, where in a less extreme style, they may be declared locally. Moreover, from a schema-modeling perspective, Garden of Eden can represent characteristics such as: (i)element types which can engage in type derivation; (ii) elements can engage in element substitution; and (iii) there exists no anonymous (complex) types.

The normalization component 120 can evaluate nesting scopes and/or analyze subtyping hierarchies. For example, the normalization component 120 can generalize a concept of flattening Russian Doll, to obtain Grounded Venetian Blind. In general, regardless of input style, such transformation de-anonymizes (e.g., by assigning a name to an XML schema type that is used without a name, and flattening the nesting) any anonymous complex types of local element declarations by extracting complex-type definitions; for example, the following C# code illustrates such a transformation for de-anonymization. The code leverages an API for in-memory representations of XML schemas (e.g., the ".NET schema-object model").

```
// Mark extracted types this way
public class ExtractTypeAnnotation : FxtXAnnotation { )
// Deferred transformation objects
public class ExtractType : IFxtTransformation
{
    public XmlSchemaElement element;
    public void Run( ) {
      element.SchemaType.Name = element.Name:
      element .XmlSchema( ).Add(element.SchemaType);
      element.SchemaType = null;
      element.SchemaTypeName =
      new XmlQualifiedName(
        element.Name,
        element.XmlSchema( ).TargetNamespace);
    }
// Main function of transformation
public static IEnumerable<IFxtTransformation> DeanonymizeTypes(
    XmlSchemaSet schemas.  // the schemas to transform
    FxtScope scope         .// affected abstractions
    bool strict ,          // be strict about de-anonymization
    FxtLog log             // log transformations and analyses
) {
    //   Determine potential ambiguity of local element names
    var recurrence = new Dictionary<string,int>( );
    foreach (var el in schemas.LocalXsdElements( ))
        if (el . SchemaType!=null
            && el.SchemaType is XmlSchemaComplexType)
            if (! recurrence . ContainsKey(el. Name))
                recurrence. Add(el. Name. 1);
            else
                recurrence [el .Name]++;
    foreach (var el in schemas.LocalXsdElements( ))
        // Test whether element is affected
        if (el .SchemaType!=null
            && el.SchemaType is XmlSchemaComplexType
            && scope.Test(el))
{
    // Determine name of new type
    var qname = new XmlQualifiedName(
    el .Name.
    el .XmlSchema( ).TargetNamespace);
    // Check for name clashes
    if (schemas.DefinesXsdType(qname)
        II (recurrence [el .Name] > 1)
        if (! strict)
            continue; // Skip this candidate
        else
            throw new FxtTypeClashException(qname);
    // Build and yield transformation
    var trafo = new ExtractType( );
    trafo .element = el;
    log.AtType(qname).Add(new ExtractTypeAnnotation( ));
    yield return trafo ;
    }
}
```

Accordingly, de-anonymization can be parameterized such that initially the normalization can be restricted to a scope. In addition, de-anonymization can be strict or non-strict—in the latter case, name clashes can be skipped without extracting a type, and each transformation can receive a transformation log. Furthermore, pre-conditions for such normalization typically require that the local elements of anonymous types be of distinct names, and no global types of such names can be defined in the relevant target namespace.

In a related aspect, the normalization component 120 can generalize over concept of flattening Russian Doll, to obtain Salami Slice. Regardless of style, any local element declaration (and any local attribute declaration), can typically be promoted to the top level. Given an input schema in Venetian Blind style, such normalization can effectively return a schema in Garden of Eden style.

For example:

```
// Designated annotations
public class ElementSliceXAnnotation : FxtXAnnotation { }
public class ElementSliceOAnnotation : FxtOAnnotation { }
public class AttributeSliceXAnnotation : FxtXAnnotation { }
public class AttributeSliceOAnnotaton : FoxtOAnnotation { }
// Deferred transformation objects
public class ElementSlice : IFxtTransformation {
    public XmlSchemaElement element;
    public bool extract = true;
    public void Run( ) { ... }
}
public class AttributeSlice : IFxtTransformation {
    public XrnlSchemaAttribute attribute;
    public bool extract = true;
    public void Run( ) { ... }
}
// Main function of transformation
public static IEnumerable<IFxtTransformation> SliceElements(
    XmlSchemaSet schemas, // the schemas to transform
    FxtScope scope. // affected abstractions
    bool affectAnonymous, // apply to locals of anonymous lypes
    bool affectNamed, // apply to locals of named types
    bool affectAttributes , // produce attribute slices
    bool strict , // be strict about slicing
    FxtLog log // log transformations and analyses
    ) {
    ..      . // Produce element slices
    ..      ./ / Produce attribute slices
}
```

As illustrated above, the annotation classes can illustrate that the slicing normalization involves four kinds of simple transformations, such as schema-level promotion of local elements to global scope; same concept holds for attributes; object orientation level obligation to account for promotion of elements; and same concept is valid for associated attributes.

It is to be appreciated that the object orientation level obligation to account for promotion of elements and for associated attributes can additionally apply to the formal XML, language defined by a schema. For example, a global element or attribute declaration resides, per definition, in the target namespace of the hosting schema, which implies qualification in any XML instance.

In contrast, a local declaration can reside in a local scope, and can depend on extra schema directives whether or not local elements and attributes are to be qualified; (e.g., elementFormDefault and the like.) Consequently, promotion can change the 'qualification status' for XML instances. For example, XSD rules for observing such changed status can include:

```
static bool ChangeQualification (XmlSchemaElement el)
{
var schema = el.XmlSchema( );
return (schema.TargetNamespace!=null
    && (el.Form==XmlSchemaForm.Unqualified
    II ( el . Form==XmlSchemaForm.None
        && (schema.ElementFormDefault==XmlSchemaForm.Unqualified
        II schema.ElementFormDefault==XmlSchemaForm.None))));
}
```

Moreover, the actual transformation can include the following for imposing obligations on the object oriented level of the schema to object mapping:

if (ChangeQualification (el))
    log .AtElement(qname).Add(new ElementSliceOAnnotation( ));

The corresponding annotation can subsequently be observed by remaining XML schema to object mapping, when operating at the object oriented level. Accordingly, relevant object types can be implemented as if unqualified global elements and attributes were admitted by XSD.

It is to be appreciated that the resulting slices typically should not clash with existing global abstractions. Moreover, regarding possibility of multiple occurrences of the same local name—rather than forbidding such multiple occurrences, permissive rules such as the following can be defined:

```
static bool Unambiguous(List<XmlSchemaElement> els, FxtLog log)
{
    return els .Count==1 // Trivially unambiguous
    II (
        // Test compatibility of multiple elements
        els . All (el =>
            el .SchemaType == null
            && els [O]. SchemaTypeName == el.SchemaTypeName
            && els [O]. IsNillable == el. IsNillable
            && els [O] . Form == el.Form)
        &&
        // Obligations cannot be merged
        ! els .Any(el =>
        (log. AtObject(el). OfType< FxtOAnnotation>
        ( ) .Any( )))) ;
}
```

Such rules indicate that multiple usages with same the type reference are acceptable, while multiple usages with anonymous types are typically unacceptable. Additionally, there exist checks for compatibility of properties such as: nullability, form (qualification) and annotations for obligations. According to a further aspect and regarding elimination of type definitions, a Garden of Eden style can be normalized to obtain an object model, as if no substitution groups were employed. For example, such normalization can manage elimination of type definitions in a general manner, such as:

```
// Record eliminated type definition this way
public class EliminateTypeDefXAnnotation : FxtAnnotation { }
// Obligate OO-level elimination this way
public class EliminateTypeDefOAnnotation : FxtAnnotation { }
// Deferred transformation objects
public class EliminateTypeDef : IFxtTransformation {
    public XmlSchemaType type; // obsolete type
    public XmlSchemaElement element; //referring element
    public void Run( ) { ... }
}
// Main function of transformation
public static IEnumerable<IFxtTransformation> EliminateTypeDefs(
    XmlSchemaSet schemas, // the schemas to transform
```

-continued

```
    FxtScope scope, // scope test affected abstractions
    FxtLog log // log transformations and analyses
} {
.   ..   // Perform schema -level elimination
...        // Advise OO -level elimination
}
```

One aspect of such elimination concerns the proper identification of type derivation coupled with element subtyping (e.g., substitution groups). Accordingly (and subject to appropriate preconditions) the type tree behind a substitution group can be inlined and eliminated—(typically actual transformation need to be delegated to the object oriented level, due to the XSD language rules.)

In general, such an analysis requires the following auxiliary data structures:

referencedBy[t]—all element declarations referring to t.
tRoots—all roots of the type-derivation forest.
tMembers[r]—all types reachable from a certain root r.
eRoots—all roots of the element-substitution forest.
eMembers[r]—all elements reachable from a certain root r Such data structures can be readily computed by navigation thru a schema set and following derivation and substitution relationships. Moreover, helper functions such as schemas.RootElement(n) and schemas.RootType(n); can determine the rooting element or type for a given element or type name n, respectively. Based on such data structures, the subject innovation can determine dispensable type-derivation trees, as illustrated below

```
var dispensable =
    tRoots. Where(tRoot =>
        tMembers[tRoot] .Count>1
    && referencedBy[tRoot].Count==1
    && referencedBy[tRoot] .All (eRoot =>
        eRoot. IsGlobal ( )
        && tMembers[tRoot].All(tMember =>
            referencedBy[tMember].Count>O
        && referencedBy[tMember].All(eMember =>
            eMember.IsGlobal( )
        && schemas.RootElement(eMember.QualifiedName)
            == eRoot.QualifiedName))))
```

Figure 2:
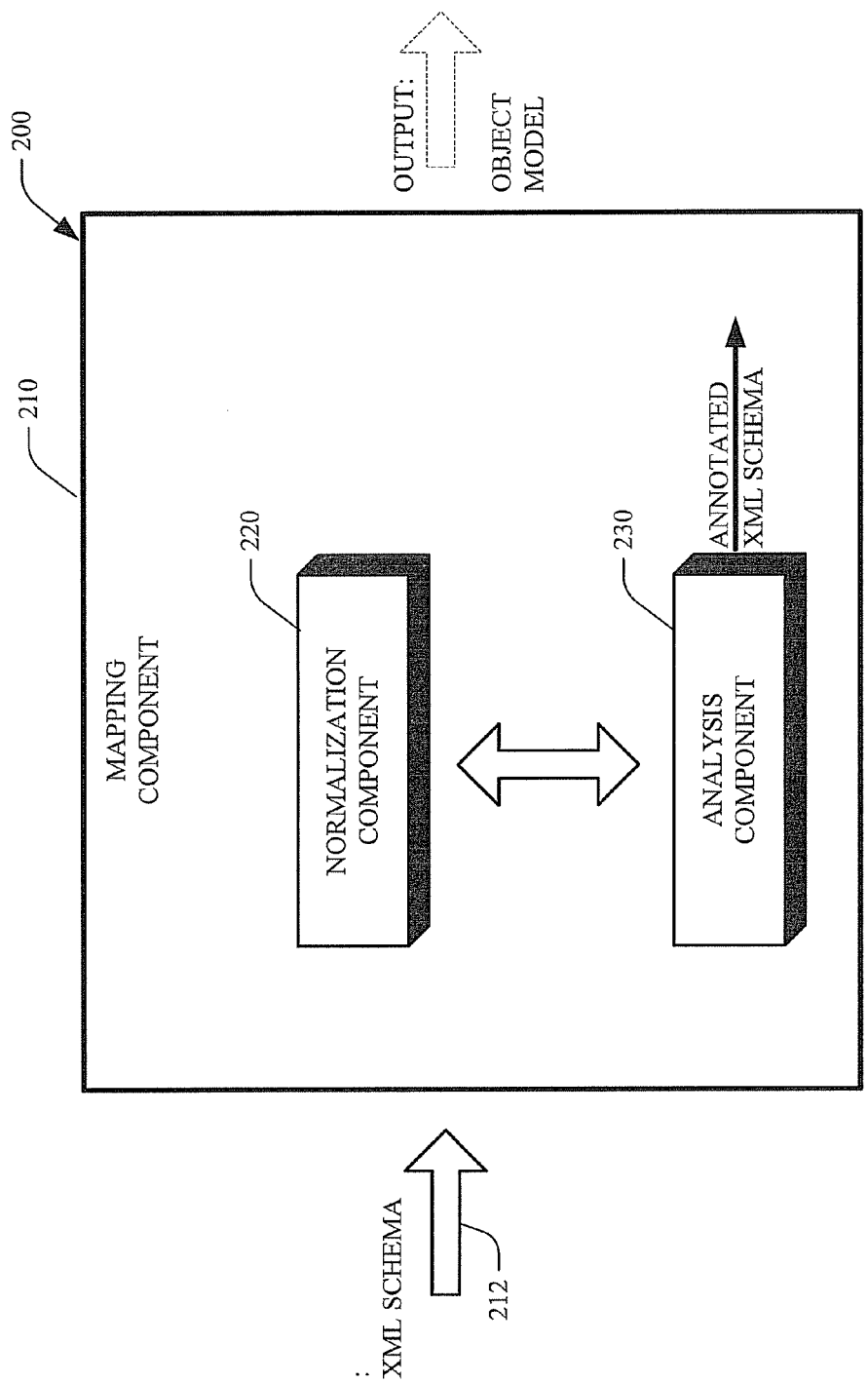
FIG. 2 illustrates a further exemplary aspect of a mapping component that includes an analysis component to perform precondition checking according to a particular aspect of the subject innovation.

The above expression employs higher order functions. A tree in the type-derivation forest is dispensable if all its members are referenced by at least one global element and all such elements can belong to the same substitution group where the root of type tree is referenced by the root of the element tree. The object oriented elimination of type trees can then proceed as follows. For example:

foreach (var tRoot in dispensable)
    foreach (var tMember in tMembers[tRoot])
        log.AtType(tMember).Add(new EliminateTypeDefOAnnotation( ));

FIG. 2 illustrates a system 200 for transformation of XML schema to an object model in accordance with an aspect of the subject innovation. The mapping component 210 of the system 200 further includes an analysis component 230 that interacts with the normalization component 220. The analysis component 230 analyzes an XML schema input 212 and determines which simplifications can be supplied at the schema level stage, and which simplifications are to be performed at a subsequent object level (e.g., after a core canonical mapping is performed), to complete the normalization and/or mapping based on the earlier analysis (e.g., create an annotated XML schema.) For example, the analysis component 230 can analyze the input XML schema to obtain an annotated schema at a schema level, and such annotated schema level can then be supplied to the schema level transformation, to obtain a normalized annotated schema. A common decomposition for all transformations can be employed such as;

```
// Entries for transformation log
public class MyAnnotation : FxtAnnotation { ... }
// Deferred transformation objects
public class MyTransformation : IFxtTransforrnation { ... }
// Main function of transformation
public static IEnumerable<IFxtTransformation> MyTransforrm(
    XmlSchemaSet set, // the schemas to transform
    ...
) {
    ...         // Perform analyzer's and check preconditions
    ...         // Change and obligation logging with annotations
    ..          . // Build and yield deferred transformation objects
}
```

The analysis component 230 can perform a precondition checking, wherein schema analysis and actual transformations are separated. For example, the main function for a transformation, MyTransform performs checks, but defers the actual transformations to one or more 'deferred transformation objects' that are returned as a result. Such a procedure simplifies operations because all preconditions can be checked on a 'clean' compiled, such as static Schema Object Model (SOM) graph. Moreover, since transformations are not commenced prematurely they need not be rolled back. The interface for deferred transformation objects can include:

public interface IFxtTransformation {void Run( );}

Moreover, since Log entries (and/or annotations) are associated with certain parts of a schema—types, elements or other schema objects, the log can have a structure of:

```
public abstract class FxtAnnotation { }
public class FxtLog {
    public List <FxtAnnotation> AtType(XmlQualifiedName n) { ... }
    public List <FxtAnnotation> AtElement(XmlQualifiedName n) { ... }
    public List <FxtAnnotation> AtObject(XmlSchemaObject o) { ... )
```

As indicated, for the two major kinds of annotations of, public abstract class FxtXAnnotation: FxtAnnotation { }
public abstract class FxtOAnnotation: FxtAnnotation { }

The type FxtXAnnotation can root annotations for change logging regarding schema level transformations. The type FxtOAnnotation can root annotations for obligation logging regarding object orientation level transformations. Accordingly, such annotations can carry on information from the schema analyses and transformations to the back-end of the X-to-0 mapping. For example, Obligating annotations can be depicted as:

```
// Annotation type to obligate X-to-O mapping
public class RenameLocalAttribute : FxtOAnnotation {
    public string oldName;
}
    // Renaming transformation
    var e = ...; // local element (scope)
    var oldName = ...; // old attribute name
```

-continued

```
    var newName = ... ; // new attribute name
    foreach (var a in e.XsdAttributeslnScope( ))
        if (a. Name==oldName) {
            a . Name = newName:
            log. AtObject(a). Add(
                new RenameLocalAttribute { oldName = oldName });
}
```

Such sample code concerns attribute re-naming that can be required for preparation of other normalizing transformations, to mitigate name clashes that would otherwise make the normalization inapplicable. For example, the subject innovation can annotate each renamed attribute with an object orientation level obligation (e.g., the back-end of the XML schema to object mapping can consider any renaming that was carried out in the schema.) The normalized annotated schema can then be provided to a core mapping object to obtain a preliminary annotated object model, followed by an annotated driven object model transformation, as described in detail infra.

Figure 3:
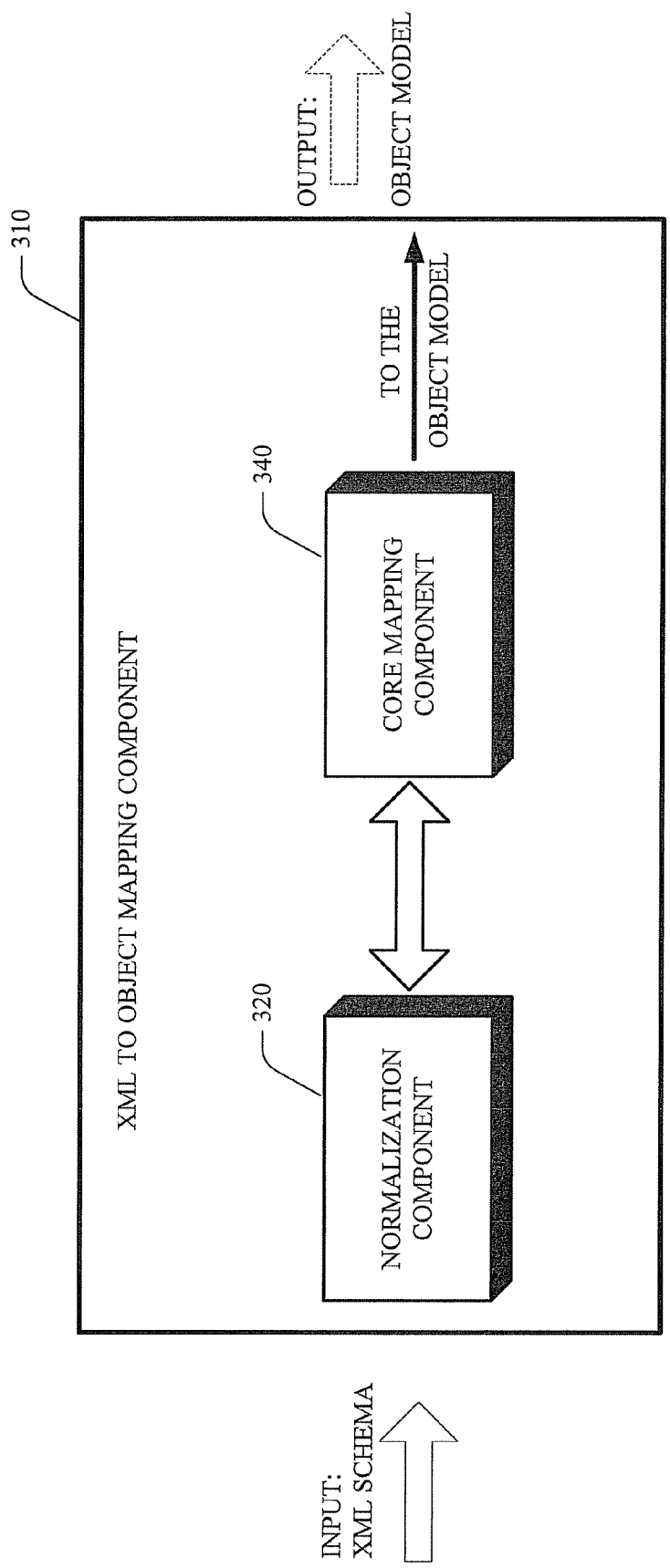
FIG. 3 illustrates a block diagram for a mapping component that further includes a core mapping component in accordance with an aspect of the subject innovation.

FIG. 3 illustrates a system 310 that supplies a core mapping, which can be performed after the normalization stage of the normalization component 320, wherein XML types such as schemas are mapped to object models. Such core mapping is performed via the core mapping component 340 that can employ a core canonical mapping, to supply the object model. By separating the core mapping from normalization in accordance with the subject innovation, there is an increased likelihood that resulting object model to meet expectation as schemas become more organized, and the schema more closely resembles styles for object types/data to facilitate mapping between XML schemas and object type.

Figure 4:
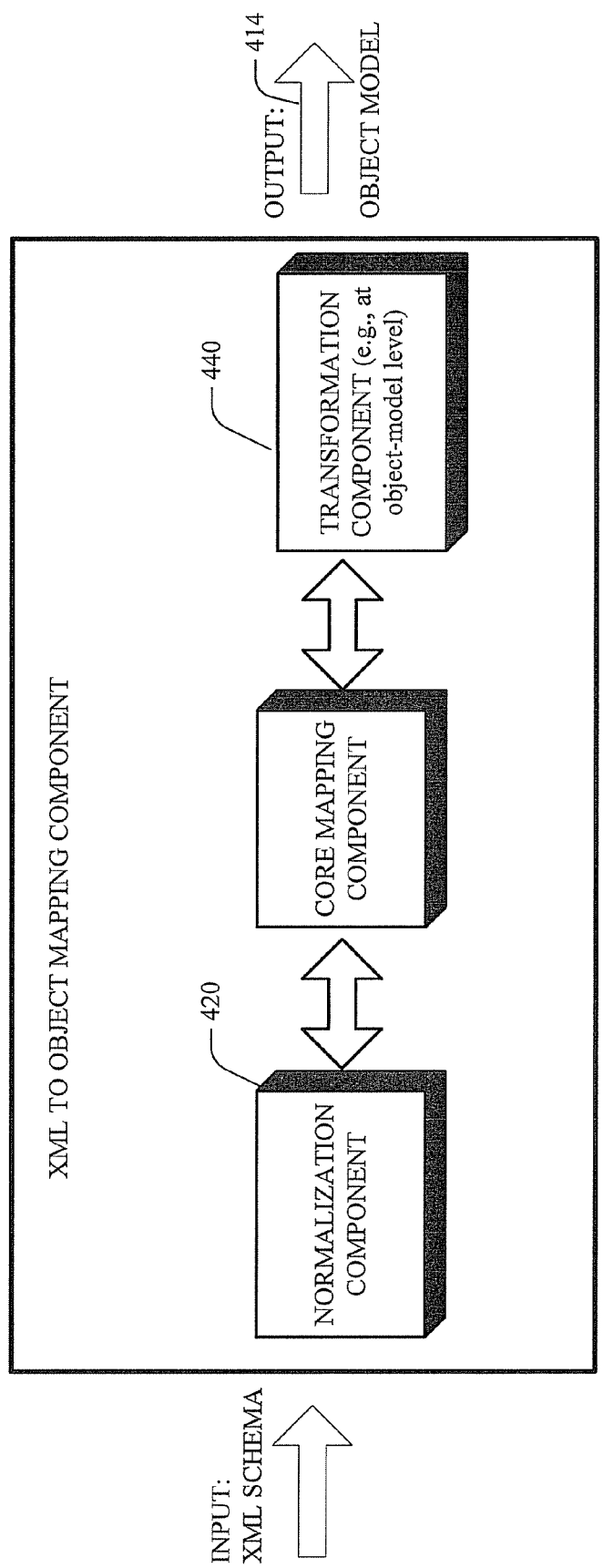
FIG. 4 illustrates a further exemplary block diagram of a mapping component with a transformation at an object level in accordance with an aspect of the subject innovation.

FIG. 4 illustrates a further aspect of the subject innovation, wherein a subsequent transformation at an object level can typically be performed (e.g., on the object model) via a transformation component 440, to create the object model 414 (e.g., final object model). Such transformation component 440 manages normalization for the XML schema 412 that in general cannot be performed via the normalization component 420 (e.g., those XML schema expressivity issues that cannot be performed at a schema level), and which require completion at the object level.

Figure 5:
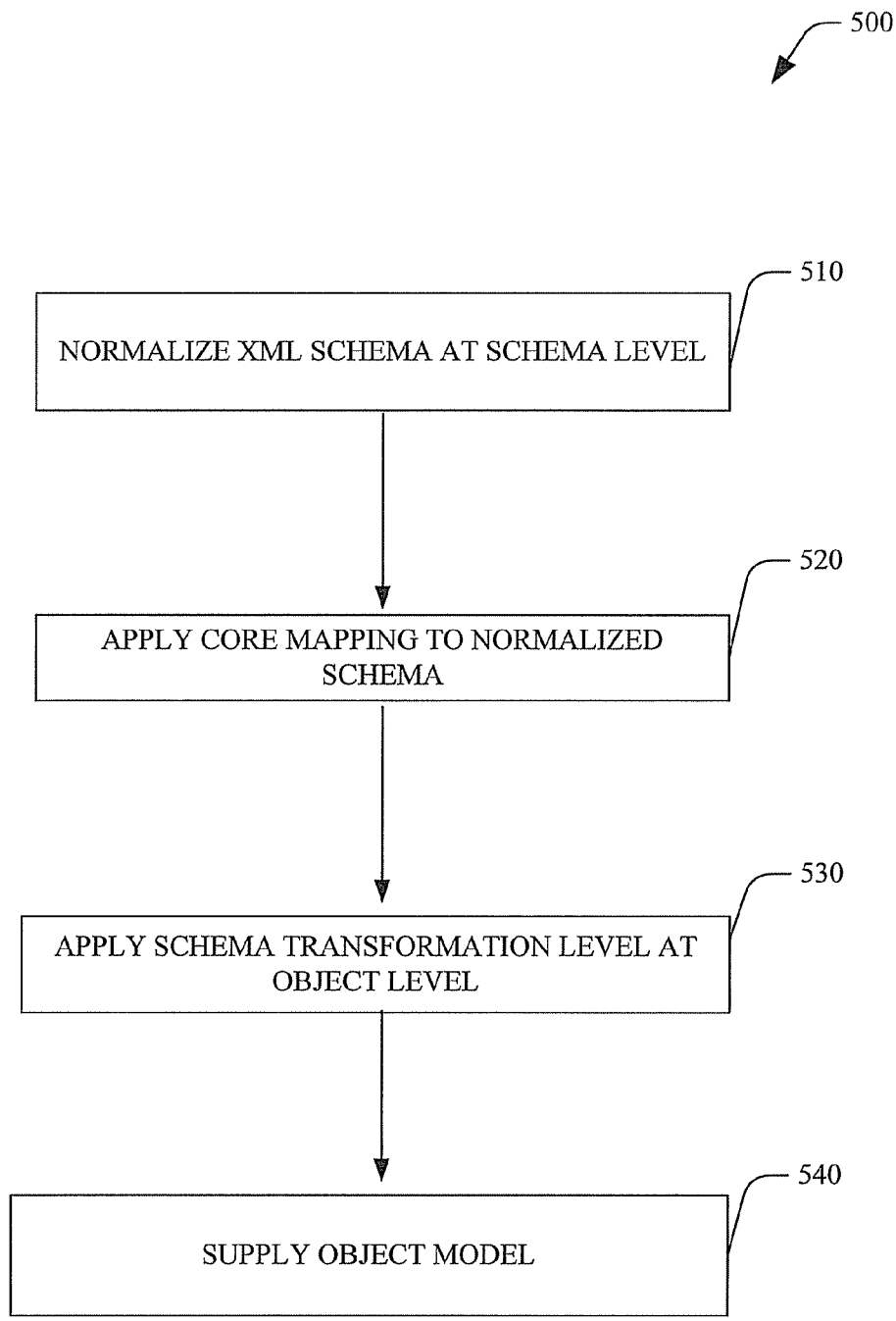
FIG. 5 illustrates a methodology of supplying an object model in accordance with an aspect of the subject innovation.

FIG. 5 illustrates a methodology of normalizing an XML schema model in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially and at 510, XML schema can be normalized at the schema level. Next and at 520 a core mapping can be applied to such normalized schema, wherein a core canonical mapping can supply the object model. By separating the core mapping from normalization in accordance with the subject innovation, there is an increased likelihood for resulting object model to meet expectation as schemas become more organized, and the schema more closely resembles styles for object types/data to facilitate mapping between XML schemas and object type. Next and at 530, a subsequent transformation at the object level can typically be performed on the object model, to create the final object model at 540. Such transformation at the object level manages normalization for the XML schema that in general cannot be performed via the normalization component (e.g., those XML schema expressivity issues that cannot be performed at a schema level, and which require completion at the object level.

Figure 6:
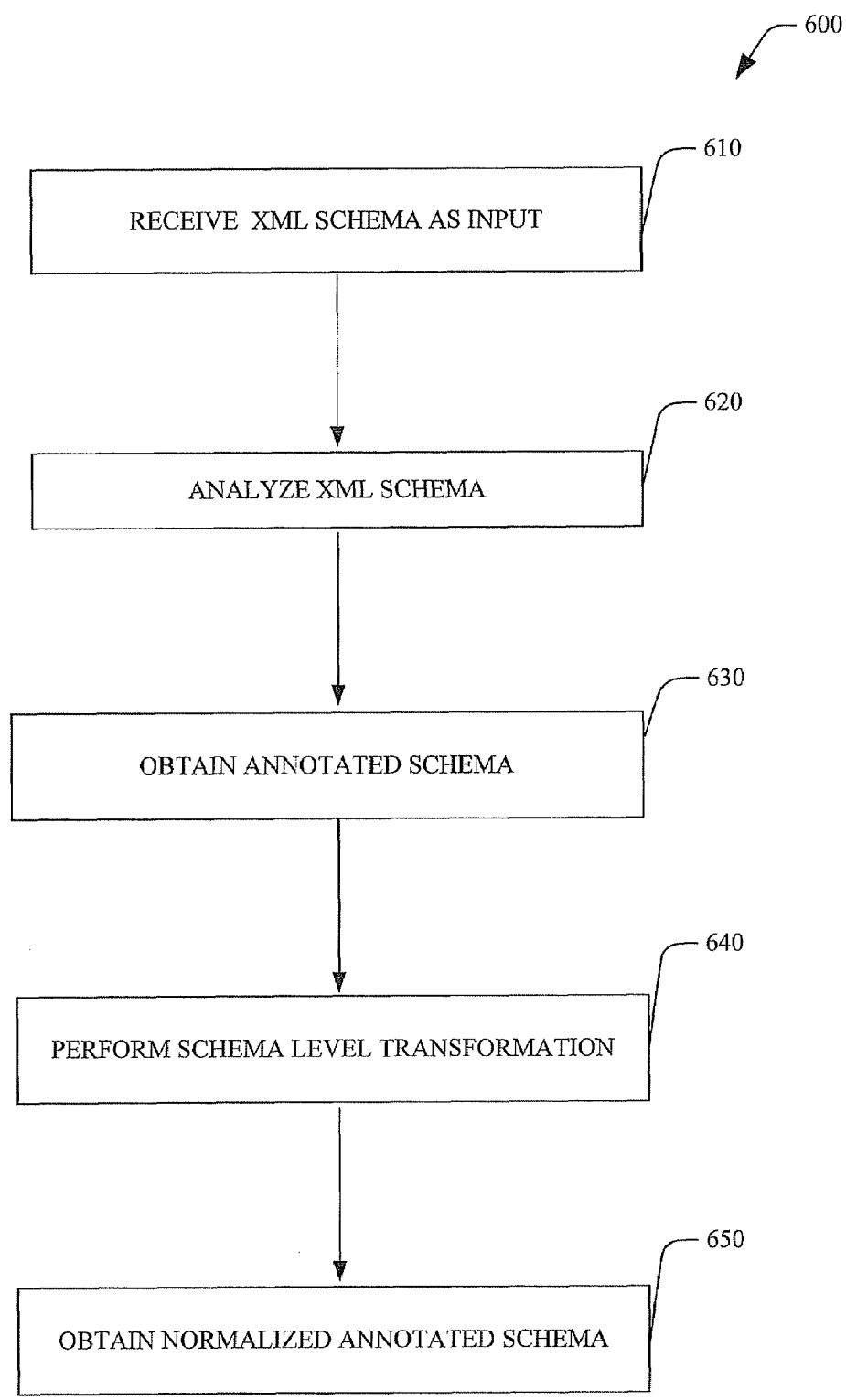
FIG. 6 illustrates a further methodology of normalizing a style in accordance with an aspect of the subject innovation.

FIG. 6 illustrates a related methodology 600 of obtaining an annotated schema in accordance with an aspect of the subject innovation. Initially and at 610 an XML schema can be received by the normalization component. At 620 an analysis is performed, to determine which simplifications of the XML schema can be supplied at the schema level stage, and which simplifications are to be performed at a subsequent object level (e.g., after a core canonical mapping is performed). Accordingly, at 630 an annotated schema at a schema level can be obtained. A schema level transformation can be performed on the annotated schema at 640, to obtain a normalized annotated schema, at 650.

Figure 7:
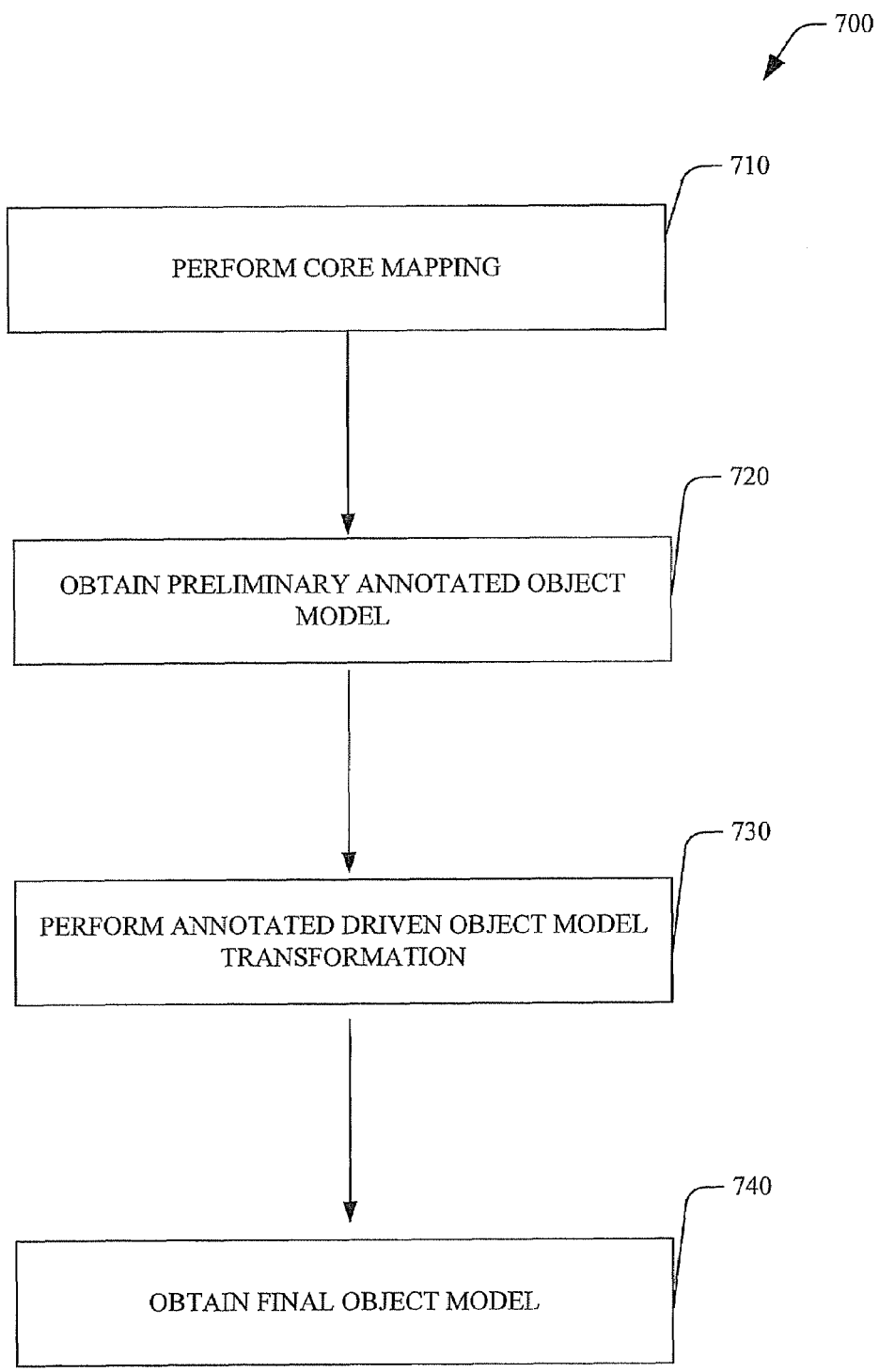
FIG. 7 illustrates a related methodology of object model transformation in accordance to a particular aspect of the subject innovation.

FIG. 7 illustrates a further methodology 700 of performing annotated driven object model transformation for an XML schema that has been normalized to obtain an annotated schema. At 710, a core mapping is performed on the annotated schema, to obtain a preliminary annotated object model at 720. Subsequently, and at 730 an object model transformation is performed on the preliminary annotated object model, as described in detail supra. An object model can hence be created at 740, wherein an object impedance mismatch is reduced or eliminated.

As used in herein, the terms "component," "system" and the like are intended to refer to a computer-related entity, either hardware, a combination of hardware and software, software or software in execution. For example, a component can be, but is not limited to being, a process running on a processor, a processor, an object, an instance, an executable, a thread of execution, a program and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Furthermore, all or portions of the subject innovation can be implemented as a system, method, apparatus, or article of manufacture using standard programming and/or engineering techniques to produce software, firmware, hardware or any combination thereof to control a computer to implement the disclosed innovation. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 8:
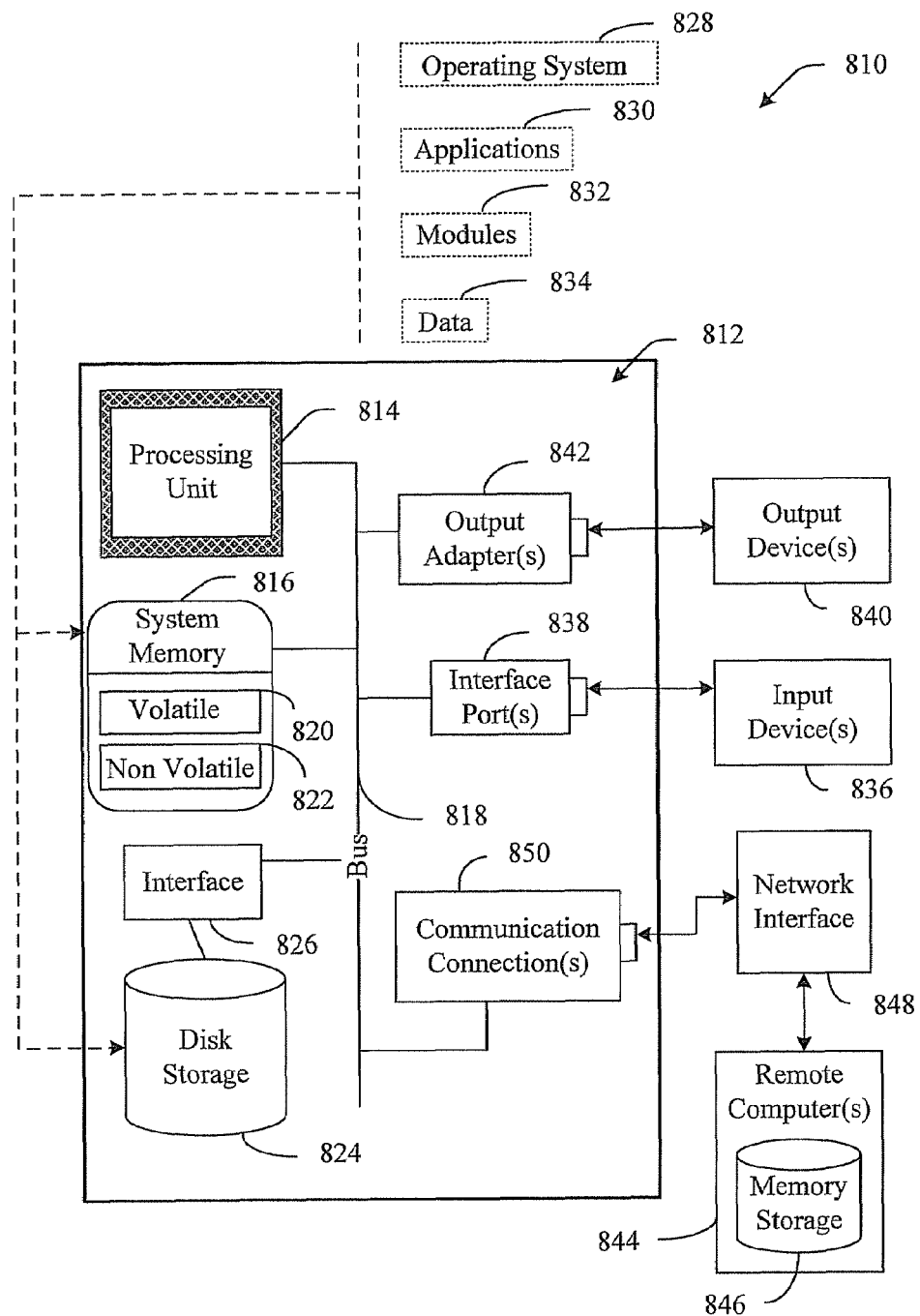
FIG. 8 illustrates an exemplary operating environment for implementing various aspects of the subject innovation.
Figure 9:
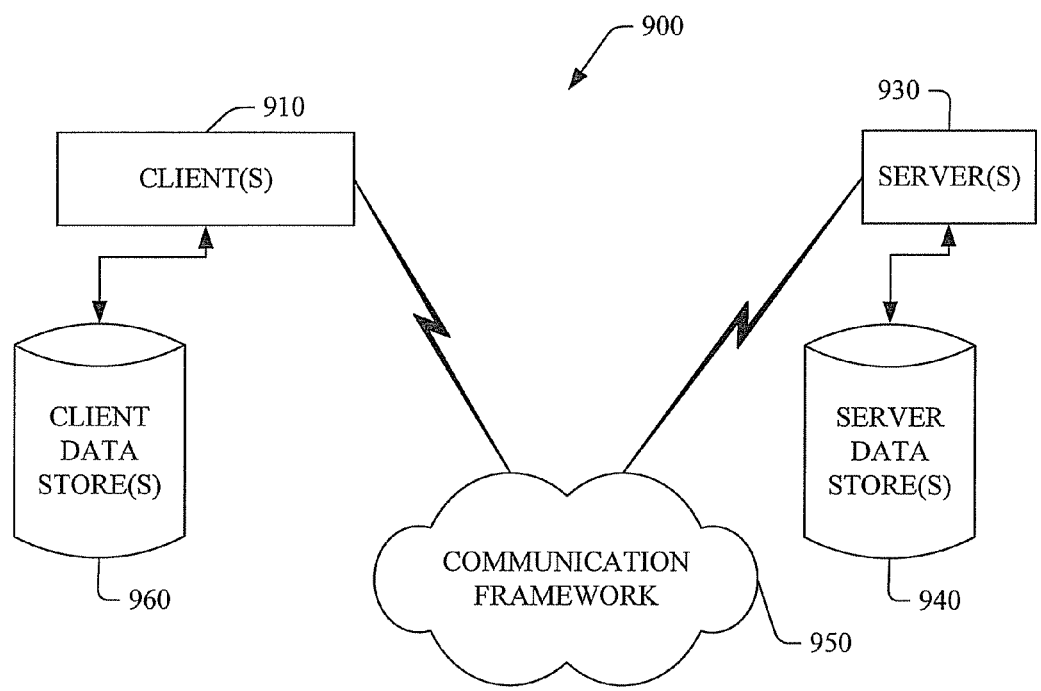
FIG. 9 illustrates a schematic block diagram of a sample computing environment with which the subject innovation can interact.

In order to provide a context for the various aspects of the disclosed subject matter, FIGS. 8 and 9 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the innovation also may be implemented in combination with other program modules. Generally, program modules include routines, programs, components, data structures, and the like, which perform particular tasks and/or implement particular abstract data types. Moreover, those skilled in the art will appreciate that the innovative methods can be practiced with other computer system configurations, including single-processor or multiprocessor computer systems, mini-computing devices, mainframe computers, as well as personal computers, handheld computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the innovation can be practiced on stand-alone computers. In a distributed computing environment, program modules may be located in both local and remote memory storage devices.

With reference to FIG. 8, an exemplary environment 810 for implementing various aspects of the subject innovation is described that includes a computer 812. The computer 812 includes a processing unit 814, a system memory 816, and a system bus 818. The system bus 818 couples system components including, but not limited to, the system memory 816 to the processing unit 814. The processing unit 814 can be any of various available processors. Dual microprocessors and other multiprocessor architectures also can be employed as the processing unit 814.

The system bus 818 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 816 includes volatile memory 820 and nonvolatile memory 822. The basic input/output system (BIOS), containing the basic routines to transfer information between elements within the computer 812, such as during start-up, is stored in nonvolatile memory 822. By way of illustration, and not limitation, nonvolatile memory 822 can include read only memory (ROM), programmable ROM (PROM), electrically programmable ROM (EPROM), electrically erasable ROM (EEPROM), or flash memory. Volatile memory 820 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 812 also includes removable/non-removable, volatile/non-volatile computer storage media. FIG. 8 illustrates a disk storage 824, wherein such disk storage 824 includes, but is not limited to, devices like a magnetic disk drive, floppy disk drive, tape drive, Jaz drive, Zip drive, LS-60 drive, flash memory card, or memory stick. In addition, disk storage 824 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 824 to the system bus 1018, a removable or non-removable interface is typically used such as interface 826.

It is to be appreciated that FIG. 8 describes software that acts as an intermediary between users and the basic computer resources described in suitable operating environment 810. Such software includes an operating system 828. Operating system 828, which can be stored on disk storage 824, acts to control and allocate resources of the computer system 812. System applications 830 take advantage of the management of resources by operating system 828 through program modules 832 and program data 834 stored either in system memory 816 or on disk storage 824. It is to be appreciated that various components described herein can be implemented with various operating systems or combinations of operating systems.

A user enters commands or information into the computer 812 through input device(s) 836. Input devices 836 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 814 through the system bus 818 via interface port(s) 838. Interface port(s) 838 include, for example, a serial port, a parallel port, a game port, and a universal serial bus (USB). Output device(s) 840 use some of the same type of ports as input device(s) 836. Thus, for example, a USB port may be used to provide input to computer 812, and to output information from computer 812 to an output device 840. Output adapter 842 is provided to illustrate that there are some output devices 840 like monitors, speakers, and printers, among other output devices 840 that require special adapters. The output adapters 842 include, by way of illustration and not limitation, video and sound cards that provide a means of connection between the output device 840 and the system bus 818. It should be noted that other devices and/or systems of devices provide both input and output capabilities such as remote computer(s) 844.

Computer 812 can operate in a networked environment using logical connections to one or more remote computers, such as remote computer(s) 844. The remote computer(s) 844 can be a personal computer, a server, a router, a network PC, a workstation, a microprocessor based appliance, a peer device or other common network node and the like, and typically includes many or all of the elements described relative to computer 812. For purposes of brevity, only a memory storage device 846 is illustrated with remote computer(s) 844. Remote computer(s) 844 is logically connected to computer 812 through a network interface 848 and then physically connected via communication connection 850. Network interface 848 encompasses communication networks such as local-area networks (LAN) and wide-area networks (WAN).

LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 850 refers to the hardware/software employed to connect the network interface 848 to the bus 818. While communication connection 850 is shown for illustrative clarity inside computer 812, it can also be external to computer 812. The hardware/software necessary for connection to the network interface 848 includes, for exemplary purposes only, internal and external technologies such as, modems including regular telephone grade modems, cable modems and DSL modems, ISDN adapters, and Ethernet cards.

FIG. 9 is a schematic block diagram of a sample-computing environment 900 that can be employed for analyzing aggregated tagging behavior of users. The system 900 includes one or more client(s) 910. The client(s) 910 can be hardware and/or software (e.g., threads, processes, computing devices). The system 900 also includes one or more server(s) 930. The server(s) 930 can also be hardware and/or software (e.g., threads, processes, computing devices). The servers 930 can house threads to perform transformations by employing the components described herein, for example. One possible communication between a client 910 and a server 930 may be in the form of a data packet adapted to be transmitted between two or more computer processes. The system 900 includes a communication framework 950 that can be employed to facilitate communications between the client(s) 910 and the server(s) 930. The client(s) 910 are operatively connected to one or more client data store(s) 960 that can be employed to store information local to the client(s) 910. Similarly, the server(s) 930 are operatively connected to one or more server data store(s) 940 that can be employed to store information local to the servers 930.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims.

Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates XML to object mapping, comprising:
a processor;
a memory communicatively coupled to the processor, the memory having stored therein computer-executable instructions configured to implement the XML to object mapping system including:
a mapping component that receives an XML schema and outputs an object model, the mapping component including an analysis component, a normalizing component, and a core mapping component,
wherein the analysis component receives and analyzes the XML schema to determine one or more simplifications that can be made to the XML schema, wherein the normalizing component receives the one or more simplifications from the analysis component and modifies the XML schema accordingly to generate a normalized XML schema, and wherein the core mapping component receives and maps the normalized schema into an object model.

2. The system of claim 1 wherein the mapping component further includes a transformation component that receives the object model and performs additional transformations on the object model to generate a final object model.

3. The system of claim 1, the XML schema associated with an XML style, the XML style comprises a Russian doll style or a Venetian Blind style or a combination thereof.

4. A computer implemented method comprising the following computer executable acts:

receiving an XML schema to be converted into an object model;

analyzing the XML schema to determine one or more simplifications to can be made to the XML schema to facilitate conversion to the object model;

performing the one or more simplifications on the XML schema to form a normalized schema that resembles an object model; and mapping the normalized schema to form the object model.

5. The computer implemented method of claim 4 further comprising automating the formation of the normalized schema.

6. The computer implemented method of claim 4, wherein one of the one or more simplifications includes flattening a nesting scope of the XML schema.

7. The computer implemented method of claim 4, wherein one of the one or more simplifications includes reducing the number of types in subtyping hierarchies.

8. The computer implemented method of claim 4 further comprising performing additional transformations on the object model to generate a final object model.

9. The computer implemented method of claim 7 further comprising flattening a Russian Doll style to obtain a Grounded Venetian Blind Style.

10. The computer implemented of claim 7 further comprising flattening a Russian Doll Style to obtain a Salami Slice Style.

11. The computer implemented method of claim 8 further comprising mitigating an object impedance mismatch.

12. A computer storage medium having stored thereon computer executable instructions which when executed by a processor perform the method of claim 4.

* * * * *